Patented Mar. 22, 1927.

1,621,875

UNITED STATES PATENT OFFICE.

EDUARD DEDOLPH, OF HEDLEY, BRITISH COLUMBIA, CANADA.

FERTILIZER.

No Drawing. Application filed May 29, 1925, Serial No. 33,647, and in Canada June 5, 1924.

The invention relates to chemical fertilizers and plant stimulators, and more particularly to what may be termed a sulphur-lime fertilizer, composed of sulphur and crushed limerock, to which may be added suitable quantities of nitrogen, potassium and/or phosphorus-containing material. Proportions of about four parts of limerock (calcium carbonate) to about one part of sulphur may be given as an example, but the proportions are necessarily variable within rather wide limits.

The material are crushed and preferably pulverized and are thoroughly mixed, and the composition is applied to the soil at any time just before planting the seeds, or during the growth of the plants. It is advantageous to employ inoculated sulphur that is to say, powdered sulphur inoculated with nitrogen-producing bacteria, such, for example, as inoculated alfalfa seed.

It is a recognized fact that for the process of photosynthesis by which plants manufacture their carbohydrates (sugar and starch) carbon-dioxide is required from the air, and is taken in through the leaves to be acted upon, in connection with water, by the chlorophyll mechanism of the plant. Although there is $CO_2$ in the air, it is in very diluted form, air containing only approximately 0.04 per cent $CO_2$. If one enriches the air in the vicinity of plants in its content of carbon-dioxide, the growth of the plants is stimulated. Carbon-dioxide gas is heavier than air, and if the gas is supplied at or near the surface of the soil, it is not easily dislodged, and the plants have the best chance to absorb the gas and grow.

Sulphur has the tendency, if applied to the soil, to decompose parts of the soil through the action of water, air, light, and other natural forces and make the resultant product more available for plant food. Sulphur is a good plant growth stimulator.

Limerock is composed of $CAO = 56$ per cent and carbon-dioxide $= 44$ per cent. Therefore, 100 pounds of limerock contain 44 pounds of $CO_2$, which when liberated can supply about four bushels of corn with its needed $CO_2$ nourishment, if there would not be any $CO_2$ in the air, but as applied it enriches the air to a great extent and promotes the growth of the plants.

Sulphur seems to act especially on limerock if mixed with the soil and releases the $CO_2$ of the rock for plant food, the gas staying close to the plants so as to be easily absorbed by them.

The proportions of sulphur and limerock are variable, since the action of the sulphur depends to a considerable extent on the nature of the soil; consequently the fertilizer will be made in different specific proportions for different types of soil, the proportions in any case, however, being such that, when the composition is applied to the soil, the sulphur in conjunction with the calcium carbonate will act to liberate a desired amount of carbon dioxide at such a rate as to increase the carbon dioxide constituent of the atmosphere adjacent the plants in a substantial and useful degree for the promotion of plant growth. In some cases the proportion of sulphur may be as low as five per cent or even lower, possibly as low as one per cent. In other cases, a much larger amount of sulphur may be required; twenty or twenty-five per cent should be as much as might be required, though a still larger proportion, up to, say fifty per cent, might be employed if, for example, a greater action of the sulphur on the soil, in addition to its reaction with the limerock, were desired. The most economical proportions of the two ingredients for a given kind of soil is readily ascertainable. The action of the limerock is also to make and keep the soil sweet; and the excess of limerock for this purpose indicated by the proportions should naturally be adjusted to the acidity or lack of acidity of various soils. For a soil naturally strongly acid, for example, the proportion of sulphur should be appropriately low, and that of the limerock correspondingly high. It will be understood that the reaction between the sulphur, or the sulphuric acid resulting when sulphur is applied to the soil, and the limerock, is a gradual and continuing one; and the rate of evolution of the desired $CO_2$ is regulated by the percentages, the state of the sulphur, the presence or absence of other ingredients that may be incorporated in the fertilizer, and the particular soil.

The other components of the fertilizer, like nitrate of potassium, or other nitre and potassium containing material and phosphorus containing substances are simply added to help the plant growth, if there should be a deficiency of these elements in the soil.

What I claim as new is:

1. A fertilizer for application to the soil of fields in which crops are grown, comprising an intimate mixture of finely divided limerock and sulphur.

2. A fertilizer for application to the soil of fields in which crops are grown, comprising an intimate mixture of finely divided limerock and sulphur in which the sulphur content varies from one to fifty percent, the percentage of sulphur for any particular soil being so chosen that the sulphur will act to decompose parts of the soil and to react with some of the limerock to enrich the air near the ground with carbon-dioxide, while the limerock present in the composition which is unaffected by the sulphur serves to sweeten the soil.

3. The method of promoting plant growth which comprises applying to the soil of fields in which crops are grown, an intimate mixture of limerock with sulphur adapted to act upon the calcium carbonate, and thereby both improving the soil and enriching the air near the ground with liberated carbon-dioxide.

EDUARD DEDOLPH.